(No Model.)

C. T. PELTON.
WHEEL.

No. 547,357. Patented Oct. 1, 1895.

WITNESSES:

INVENTOR
C. T. Pelton
BY
Munn & Co.
ATTORNEYS.

UNITED STATES PATENT OFFICE.

CHILION T. PELTON, OF RIVERSIDE, CALIFORNIA.

WHEEL.

SPECIFICATION forming part of Letters Patent No. 547,357, dated October 1, 1895.

Application filed December 1, 1894. Serial No. 530,564. (No model.)

*To all whom it may concern:*

Be it known that I, CHILION T. PELTON, of Riverside, in the county of San Bernardino and State of California, have invented a new and useful Improvement in Wheels, of which the following is a full, clear, and exact description.

My invention relates to an improvement in wheels, and especially to the construction of wheels for reapers and mowers and like machines.

The object of the invention is to so construct the wheel that when moving over sandy or dusty roads or fields the dust or sand will not be carried upward by the wheels, consequently preventing the dust from annoying the driver or entering the journal-boxes or clogging up the parts of the machine that are lubricated.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in both views.

Figure 2:
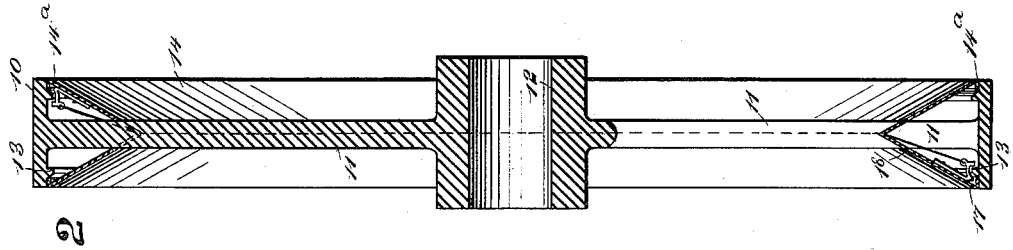
Figure 1:
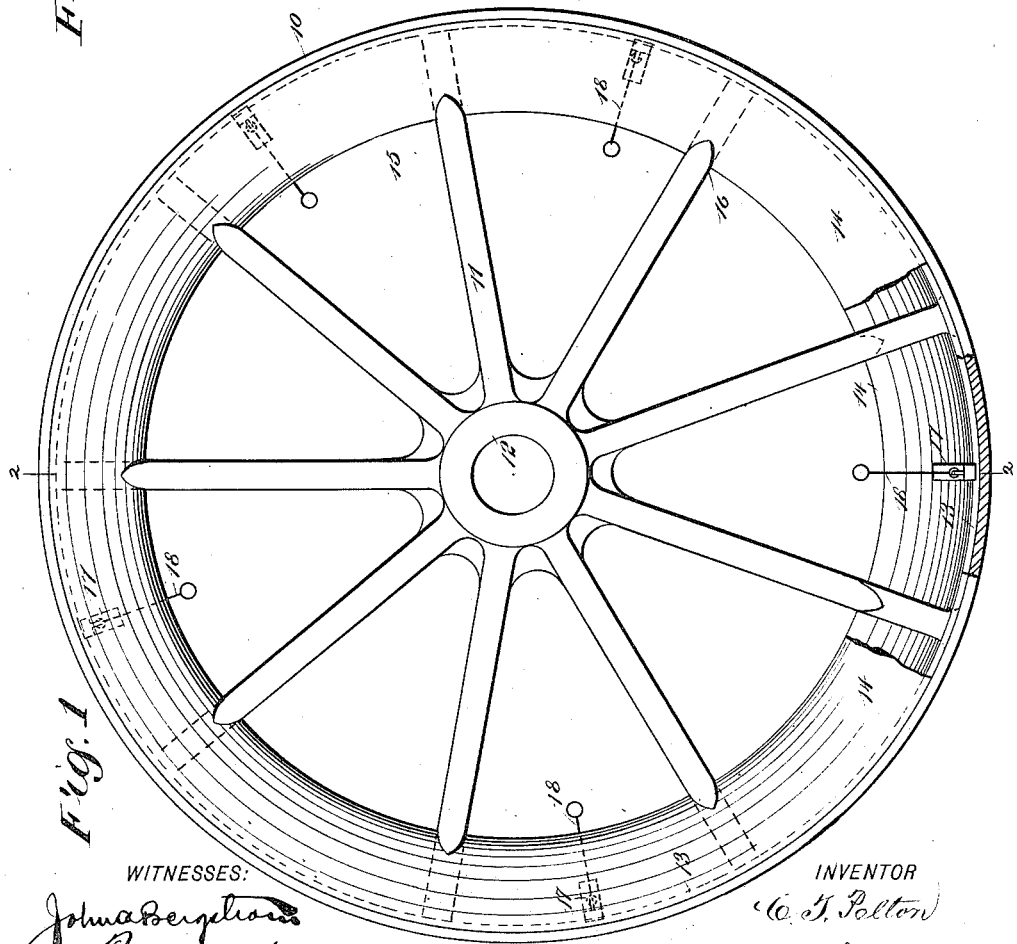

Figure 1 is a side elevation of the improved wheel, a portion thereof being broken away; and Fig. 2 is a section through the wheel, taken essentially on the line 2 2 of Fig. 1.

In carrying out the invention the rim 10 of the wheel is connected by spokes 11 with a hub 12 in the usual manner, the spokes connecting with the rim at or near the center. At each side of the transverse center of the rim of the wheel, upon its inner face, an annular rib 13 is formed, the outer face of each rib being inclined and the inner face straight. Two cover-plates 14 are employed in connection with the wheel, and the said cover-plates are dished or shaped to represent the frustum of a cone. The plates are of substantially the same construction; but one is slightly wider than the other, and each is provided with a central opening 15, of predetermined size. The width of the plates is preferably about the width of the rim of the wheel. The plates have one edge of each placed flush with the side edges of the rim 10 of the wheel and converge toward each other to such an extent that both of the cover-plates meet around the hub 12, the inner edge of the wider plate being fluted or flanged outward over the corresponding edge of the narrower plate. When the plates are in position, they, together with the rim, form substantially a triangle in cross-section. A flange 14$^a$ is formed upon the inner face of the outer edge of each plate in order to stiffen the same, and the said flanges are brought in contact with the ribs 13, serving to prevent the plates being pushed too far inward. It will be understood that the ribs 13 need not be annular or continuous, but may be made in short lengths and placed at desired intervals apart.

At the meeting of the plates around the hub rests 16 are formed, suitably shaped to fit around the spokes 11, as shown in Fig. 1. The plates are preferably removably held in engagement with the body of the wheel, and to that end a series of spring-latches 17 are secured at predetermined intervals apart upon the inner faces of the plates at or near their peripheries, and when necessary the flanges of the plates may be cut away to admit the said latches. These latches are so shaped that they will spring over the ribs 13 when the plates have been forced to their proper position in the wheel, the heads of the latches being made to receive the said ribs, as illustrated in Fig. 2. Each latch is provided with a wire 18 or its equivalent, attached to its head, and these wires are led inward in direction of the hub of the wheel and at other suitable openings at the meeting edges of the said cover-plates, as is best shown in Fig. 1, and are made to terminate at their inner ends in rings or other forms of handles.

I desire it to be distinctly understood that the cover-plates or sections 14 of the wheel may be cast with or form an integral portion of the wheel-rim, and that in so constructing the rim it will be triangular in cross-section, the inclined faces being the inner faces, and the said rim may be either solid or hollow, as occasion may demand, and for many machines the solid form of wheel is to be preferred.

Whenever it is desirable to remove the cover-plate under the construction of the wheel shown in Fig. 1, such result may be accomplished by simply disconnecting the inner edges of the plates and drawing the wires 18 in an inwardly direction, thereby removing the latches 17 from engagement with the ribs of the wheel proper. It will be further observed that the cover-plates are flush with the outer edges of the wheel-rim, as heretofore mentioned, and incline inwardly at each side in direction of the hub. Therefore the wheel will not, and in fact cannot, carry upward any dirt, sand, or dust. The openings 15 in the plates exposing the spokes adjacent to the hub are very advantageous where gears are to be attached to the wheels or located near them. The cover-plates may be fitted to any form of wheel or pulley, or the rim of any wheel or pulley may be made triangular in cross-section.

Having thus described my invention, I claim as new and desire to secure by Letters Patent—

1. A wheel comprising a flat rim having a hub and spokes connecting the hub and rim, said rim having flanges on each side, and cover plates on each side of said rim and provided with latches located inside the cover-plates and detachably engaging said flanges on the rim, said latches having handles located outside the cover-plates substantially as set forth.

2. A wheel comprising a hub, a rim having flanges near the opposite edges of its inner face, spokes connecting the hub to the rim, and cover plates having their edges fitting inside the wheel rim with their flanges abutting on the flanges thereon, said cover plates being provided with spring latches detachably engaging flanges at opposite sides of the rim, substantially as set forth.

CHILION T. PELTON.

Witnesses:
J. L. WEST,
J. F. HOOK.